United States Patent [19]

Shiraki et al.

[11] Patent Number: 4,922,162
[45] Date of Patent: May 1, 1990

[54] DISK-TYPE SINGLE-PHASE BRUSHLESS MOTOR

[75] Inventors: Manabu Shiraki; Sumio Ishii, both of Kanagawa, Japan

[73] Assignee: Shicoh Engineering Co., Ltd., Kanagawa, Japan

[21] Appl. No.: 401,479

[22] Filed: Aug. 29, 1989

Related U.S. Application Data

[63] Continuation of Ser. No. 161,118, Feb. 26, 1988, abandoned.

[30] Foreign Application Priority Data

Oct. 23, 1987 [JP] Japan .................. 62-267944

[51] Int. Cl.⁵ .............................. H02K 1/22
[52] U.S. Cl. .................... 310/268; 310/62; 310/68 B; 310/90; 310/156; 310/193; 310/254; 310/DIG. 6; 318/254
[58] Field of Search .............. 310/268, 89, DIG. 6, 310/46, 72, 68 R, 69 B, 90, 62, 63, 179, 180, 184, 208, 177, 216, 254, 258, 259, 156, 181, 193, 67 R; 318/254

[56] References Cited

U.S. PATENT DOCUMENTS

| | | | |
|---|---|---|---|
| 4,620,139 | 10/1986 | Egami et al. | 318/254 |
| 4,682,065 | 7/1987 | English et al. | 319/90 |
| 4,724,350 | 2/1988 | Shiraki et al. | 310/268 |
| 4,725,752 | 2/1988 | Shiraki et al. | 310/268 |
| 4,728,833 | 3/1988 | Shiraki et al. | 310/68 R |
| 4,733,119 | 3/1988 | Shiraki et al. | 310/268 |
| 4,757,222 | 7/1988 | Shiraki et al. | 310/68 B |

FOREIGN PATENT DOCUMENTS 0096169 5/1985 Japan ............ 310/DIG. 6
104565 7/1987 Japan .

Primary Examiner—R. Skudy
Attorney, Agent, or Firm—Wegner & Bretschneider

[57] ABSTRACT

A disk-type single-phase brushless motor wherein a reluctance torque having a sufficient magnitude can be generated to assure self-starting and continued rotation of the motor and production of disagreeable noises is minimized. The motor comprises a stator yoke mounted in an opposing relationship to a magnet rotor with an axial air gap left therebetween. The magnet rotor has an equal circumferential pole width $\theta$. The stator yoke has a cutaway portion formed therein for enabling self-starting of the motor. The cutaway portion has a specific shape including a first radially extending edge and a second edge extending in a predetermined angular relationship from an inner end of the first edge to an outer circumferential edge of the stator yoke. The stator yoke is positioned at a predetermined angular position relative to a coreless armature coil so that the first edge thereof may be angularly spaced by a predetermined angle from a position at which a maximum starting torque is produced in the direction opposite the direction of rotation of the rotor.

18 Claims, 8 Drawing Sheets

DISK-TYPE SINGLE-PHASE BRUSHLESS MOTOR

This application is a continuation of U.S. application Ser. No. 161,118, filed Feb. 26, 1988, now abandoned.

BACKGROUND OF THE INVENTION

1. Field of the Invention

This invention relates to a disk-type single-phase brushless motor of a coreless structure which can start itself, and more particularly to a disk-type single-phase brushless motor improved in the noise problem, thereby significantly reducing noises such as vibrational noises and resonant sounds which occur when a conventional disk-type single-phase brushless motor of the same type is mounted as an axial-flow fan motor on a casing.

2. Description of the Prior Art

More and more fan motors have been being used for cooling electronic appliances of various types including office automation machines and devices, computer peripherals, power supply units and some other electronic appliances equipped with devices mounted at a high density (hereinafter called simply "high-density electronic appliances").

Particularly, axial-flow fan motors share most part of such fan motors.

This is because there is an increasing need for axial-flow fan motors arising from progressively increasing employment of electronic parts in various apparatus and systems and also from high-density mounting of such electronic parts and devices. Accordingly, it can be said that reduction in size or the size of an electronic appliance depends upon an axial-flow fan motor.

Of late, axial-flow fan motors are used very often due to the following reasons. The prices have dropped reduced significantly. It has also been recognized widely that an axial-flow fan motor is a means useful for the maintenance and improvement of the performance of an electronic appliance, above all, one of its parts.

In view of the current trend toward high-density mounting of devices, an electronic appliance should be designed to minimize heat generation and to withstand the surrounding temperature so that no air-cooling is required practically, in other words, no axial-flow fan motor is needed in order to achieve further size and cost reduction on the electronic appliance.

However, it is the existing state of things that, because such a trend of high-density mounting of devices requires further reduction in size and improvement in accuracy of an electronic part, it cannot be avoided to use an axial-flow fan motor for cooling such devices in order that heat may not have an influence upon the characteristics of the electronic part.

Here, the trend of high-density mounting of devices has now required further reduction in size and thickness as well as in weight comparing with conventional axial-flow fan motors which have been used so far.

The above requirement has arisen mostly for the following reasons. The high-density electronic appliance involves only a limited spacing in which an axial-flow fan motor is to be installed because it is designed strictly for reduction in size. The weight of an axial-flow fan motor is required to be so light that it can be supported easily by a housing or some other elements. More electronic appliances have been adopted, which can achieve their own functions with air-cooling of a lower degree because they are designed to cope with the problem of heat. There are more electronic appliances which work well without need for a large and expensive axial-flow fan motor of a very large wind volume. There are more electronic appliances in which other requirements such as small size, light weight, flat configuration and low cost have higher importance.

Meanwhile, such an instance often occurs that it is desired to incorporate an axial-flow fan motor for cooling in an electronic appliance from anxiety about generation of heat after the electronic appliance has been designed with a recognition that there is no necessity of cooling the same. Generally in the high-density electronic appliance, however, a conventional axial-flow fan motor of a considerable size cannot be installed because it is designed strictly with its spacing minimized and accordingly will involve no sufficient empty spacing as described above. Therefore, an axial-flow fan motor of a reduced size and thickness is required.

It is to be noted that axial-flow fan motors are divided into three typical types including an ac induction motor type, a dc brush motor type and a presently prevailing brushless (dc) motor type. Brushless motors are used very often for axial-flow fan motors due to many advantages thereof comparing with motors of the other types.

In recent years, brushless motors have been used widely due to an advantage that they are generally high in reliability in addition to characteristics thereof as a dc motor that they produce a high toque for their size and are good in controllability.

Further, disk-type brushless motors of an axial gap structure which have an axial air gap therein are widely used for disk-type brushless axial-flow fan motors for use with office automation machines and devices and the like because they can be readily reduced in thickness.

Here, a brushless motor has a drawback that it is high in cost because it requires, for each of a number of phases thereof, a position-detecting element such as a Hall effect element for detecting a north or south magnetic pole of a magnet rotor and a circuit for switchably energizing an armature coil or coils (i.e. a driving circuit which may otherwise be called electronic commutating circuit) using the position-detecting element.

Accordingly, it is not a good policy to use such an expensive brushless motor having a plurality of phases for an axial-flow fan motor which is used to blow a wind for cooling.

Therefore, for axial-flow fan motors, single-phase brushless motors are used which require only one position-detecting element and only one driving circuit for the single phase because it can be produced at a low cost.

However, such a single-phase brushless motor has a so-called dead point at an energization switching point at which the motor provides zero torque.

In order to eliminate such dead points to enable a single-phase brushless motor to start itself from any position of the rotor, normally a specific means for generating a torque is provided at each of such dead points of the motor. In particular, a reluctance torque generating member for generating a reluctance torque is provided at each of possible dead points of the motor at which no electromagnetic torque is generated by an armature coil or coils and a cooperating rotor including a field magnet.

In a coreless motor, the following methods are known by way of example for generating a reluctance torque. Referring first to FIG. 7, a rotor 2 in the form of a 6-pole field magnet having an alternate arrangement of the 6 north and south poles is mounted on a rotor yoke 1 in an opposing relationship to a stator yoke 5 with an air gap 4 left therebetween and with a pair of coreless armature coils 3 disposed in the air gap 4. In the motor of FIG. 7, the stator yoke 5 has at a face thereof opposing the rotor two inclined surfaces which thus define the complementarily inclined air gaps 4. This method, however, has a drawback that the efficiency is relatively low because the air gap is relatively great and the construction is complicated, resulting in increase in cost of the motor.

Referring now to FIG. 8, another method for generating a reluctance torque is illustrated. In the motor of FIG. 8, a pair of iron bars 6 are mounted on a stator yoke 5 and each extends through one of a pair of coreless armature coils 3 disposed in a uniform air gap 4 defined by the stator yoke 5 and a magnet rotor 2 on a rotor yoke 1. According to this arrangement, a magnetic flux 7 will appear as illustratively shown in FIG. 9 and hence the magnet rotor 2 will stop at a position where each of the iron bars 6 coincides with the center of one of the north and south poles of the magnet rotor 2. Accordingly, the armature coils 3 are located so as to produce a rotational torque at such stopping positions of the magnet rotor 2 and a position-detecting element 29 (FIG. 12) is located at a position at which it can detect one of the north and south poles of the magnet rotor 2 in order to enable the single-phase brushless motor of a coreless structure to start itself.

However, the method as shown in FIG. 8 has a drawback that if the thickness of the iron bars 6 is increased to increase the reluctance torque in order to ensure self-starting of the motor further, a phenomenon that the reluctance torque around the dead points decreases will appear because the magnetic flux will act as illustrated in FIG. 10 around the dead points to produce a magnetically stable condition.

It is to be noted that, in order to obtain an ideal torque - angular rotor-displacement curve, it is necessary to obtain a composite torque curve 8 as seen in FIG. 11. Referring to FIG. 11, a curve of an electromagnetic torque generated by an armature coil is indicated at 9 while a curve of a reluctance torque generated by a reluctance torque generating magnetic member such as the iron bar 6 mentioned above is indicated at 10.

As apparent from the electromagnetic torque curve 9 and the reluctance torque curve 10, the reluctance torque should preferably be one half of the armature torque in magnitude. This will provide the composite torque curve 8 indicative of a substantially uniform rotational torque over the entire range of rotation.

In order to obtain such an ideal composite torque as indicated by the curve 8, a reluctance torque generating magnetic member such as the iron bar 6 must be designed correctly in size and location.

Here, if the single-phase brushless motor of the principle illustrated in FIG. 7 or 8 does not include such an inclined air gap 4 or an iron bar 6 for generating a reluctance torque, such an electromagnetic torque curve 9 as shown in FIG. 11 will be obtained by the armature coil 3, but a dead point at which the motor produces no torque will appear at each energization switching point 11 of the motor. If the position-detecting element is positioned in an opposing relationship to one of such dead points 11 when the magnet rotor 2 is stopped, energization of the brushless motor will not cause the motor to generate a rotational torque. Accordingly, the motor is not suitable for practical use.

In view of such circumstances as described above, the inventors have already proposed a single-phase brushless motor of a coreless structure which attains such an ideal composite torque curve as the curve 8 shown in FIG. 11 to enable self-starting of the motor and only involves certain improvement in a stator yoke to ensure self-starting of the motor further without necessitating a special reluctance torque generating means.

A disk-type single-phase brushless axial-flow fan motor for which such a proposed single-phase brushless motor of a coreless structure is employed will be described below with reference to FIGS. 12 to 16. The fan motor generally designated at 12 includes a body 13 including an outer casing 14 which has a substantially square shape in plan and has a hollow spacing or bore formed at a central portion thereof as shown in FIG. 13. The motor body 13 further includes a generally cup-shaped motor casing 16 located in the center bore of the outer casing 14 and connected to the outer casing 14 by a plurality of radially extending stays 15 (only one is shown in FIG. 13). The motor casing 16 has a substantially channel-shaped vertical section and defines a motor receiving spacing therein. The casings 14 and 16 and stays 15 are formed as a unitary member from plastic material and define thereamong a plurality of perforations 18 through which air flows produced by impellers 17 which will be hereinafter described pass.

A pair of support posts 19 are formed uprightly in an integral relationship on the bottom of the motor casing 16 with a plastic material. A printed circuit board 20 is mounted at the top ends of the support posts 19, and a stator yoke 21 is located on the printed circuit board 20. A pair of coreless armature coils 22 and 23 are mounted in an antipodal relation at the same-phase positions on the upper face of the stator yoke 21 as shown in FIG. 14, thereby forming a coreless stator armature 24. The stator armature 24 is secured to the top ends of the support posts 19 by means of a pair of fastening screws 25 (only one is shown in FIG. 12) of non-magnetic material which extend through the stator yoke 21 and the printed circuit board 20 and are threaded into threaded holes formed in the support posts 19.

Here, in order to minimize the cost, the stator yoke 21 is required to additionally function as a reluctance torque generating member for enabling the disk-type single-phase brushless axial-flow fan motor 12 to start itself as described hereinabove.

It is to be noted that, as described hereinabove, generally a single-phase brushless motor has a drawback that, if it is stopped at a position in which its rotor and position-detecting element are positioned at a dead point, energization thereof will not cause self-starting of the motor without the provision of an additional self-starting enabling means due to its single-phase energization construction. However, the reason why a single-phase brushless motor which has the drawback described just above is used for a disk-type single-phase brushless axial-flow fan motor is that it can be constructed at a low cost because it requires only one position-detecting element and only one driving circuit. To the contrary, in the case of a brushless axial-flow fan motor of a two- or three-phase construction which can start itself without an additional self-starting enabling means and is superior in efficiency and performance, driving circuits and position-detecting elements are required by a number corresponding to the number of phases of the motor, which requires a correspondingly high cost. Accordingly, it is not preferable to use such a poly-phase brushless motor as an axial-flow fan motor which must be produced at a minimized cost.

In this manner, a single-phase brushless motor structure must be employed for an ordinary brushless axial-flow fan motor, but a single-phase brushless motor has a drawback that it cannot start itself unless it has an additional self-starting enabling means.

An exemplary one of such self-starting enabling means for a single-phase brushless motor is additional provision of a reluctance torque generating member. The provision of a reluctance torque generating member will, however, raise the cost of a motor accordingly. The axial-flow fan motor 12 thus employs a specifically devised structure wherein the stator yoke 21 has an additional function as a reluctance torque generating member.

In particular, referring to FIG. 14, the stator yoke 21 has a pair of cutaway portions 26 and 27 formed therein in such a configuration as to enable self-starting of the single-phase brushless axial-flow fan motor 12. It is to be noted here that the mere formation of a cutaway portion or cutaway portions in the stator yoke 21 could not assure optimum self-starting of the axial-flow fan motor 12. Theoretically most desired shapes and locations of the cutaway portions 26 and 27 will next be described.

The pair of cutaway portions 26 and 27 are formed at symmetrical positions spaced circumferentially by an angle of 180 degrees from each other in the stator yoke 21 located on the motor casing 16. The cutaway portions 26 and 27 have an angular or circumferential width equal to a mechanical angle of about 90 degrees. The specific configuration of the stator yoke 21 has originated from the fact that a magnet rotor 28, which will be hereinafter described with reference to FIG. 16, has up to 4 alternate north and south poles each having an angular or circumferential width of about 90 degrees.

With the stator yoke 21 in which such cutaway portions 26 and 27 are formed, opposite radially extending edges 26A, 26B and 27A, 27B defining the cutaway portions 26 and 27, respectively, present magnetically neutral positions with respect to the magnet rotor 28 at one of which the magnet rotor 28 will be stopped when the axial-flow fan motor 12 is deenergized. If the armature coils 22 and 23 are energized in the stopped position of the magnet rotor 28, the brushless axial-flow fan motor 12 will start itself without fail. Accordingly, if the coreless armature coils 22 and 23 are energized in respective predetermined directions in response to a signal from a position-detecting element, then the magnet rotor 28 shown in FIG. 16 will be rotated in the direction indicated by an arrow mark A (also referred to FIG. 14) without fail by a rotational torque generated in accordance with the Fleming's left-hand rule. It is thus necessary to dispose the two armature coils 22 and 23 at such locations as seen in FIG. 14 on the stator yoke 21 as to allow self-starting of the motor and also to dispose a single position-detecting element 29 (refer to FIG. 12) similarly at such a location.

Referring to FIG. 14, it is only magnetically-active radial conductor portions 22a, 22b and 23a, 23b of the armature coils 22 and 23 that contribute to the generation of a rotational torque. Circumferentially-extending conductor portions 22c, 22d and 23c, 23d do not contribute to the generation of a rotational torque.

In order to attain self-starting of the axial-flow fan motor 12 in a desired manner by the cutaway portions 26 and 27 of the stator yoke 21 and the armature coils 22 and 23, it is most preferable to form the cutaway portions 26 and 27 such that they have an angular width substantially equal to $n \cdot \theta$ where n is an integer equal to or greater than 1 and equal to or smaller than the number of the magnet poles of the magnet rotor 28 and $\theta$ is an angular width of each pole of the magnet rotor 28 and also to position the stator yoke 21 relative to the armature coils 22 and 23 such that the opposite radially extending edges 26A, 26B and 27A, 27B of the cutaway portions 26 and 27 are located either at positions spaced by an angular distance of about $n \cdot \theta/4$ degrees in the direction opposite the direction of rotation of the magnet rotor 28 (in the direction opposite the direction of the arrow mark A) from the positions of the center lines of the magnetically active conductor portions 22a, 22b and 23a, 23b of the armature coils 22 and 23 or at the same-phase positions (which coincide, in the arrangement of FIG. 14, with the positions of the magnetically active conductor portions 22a, 22b and 23a, 23b because the magnet rotor 28 has just four magnet poles) at each of which a maximum starting torque can be obtained.

In the arrangement shown in FIG. 14, the stator yoke 21 is positioned such that the opposite radial edges 26A, 26B and 27A, 27B of the cutaway portions 26 and 27 thereof are located at positions spaced by an angular or circumferential distance equal to one fourth of each circumferential pole width, that is, by a mechanical angle of 22.5 degrees in the direction opposite the direction of rotation of the magnet rotor 28 (in the direction opposite the direction of the arrow mark A) from the respective magnetically active conductor portions 22a, 22b and 23a, 23b of the armature coils 22 and 23 at the respective positions of which the magnetically active conductor portions 22a, 22b and 23a, 23b provide a maximum starting torque. With the arrangement, the single-phase brushless axial-flow fan motor 12 can start itself in a desired manner without employing an additional self-starting enabling means which will particularly raise the cost of the motor 12 accordingly.

Referring back to FIG. 12, electronic parts 41 in the form of chips constituting a driving circuit are mounted on a lower face of the printed circuit board 20 located on a lower face of the stator yoke 21 while the two coreless armature coils 22 and 23 and the single position-detecting element 29 such as a Hall effect element shown in FIG. 12 are mounted on an upper face of the stator yoke 21. The position-detecting element 29 is located at a position opposing one of the magnetically active conductor portions 22a, 22b and 23a, 23b of the armature coils 22 and 23 or at one of the same-phase positions. The armature coils 22 and 23 and the position-detecting element 29 constitute the coreless stator armature 24 and are disposed for relative rotation in a face-to-face opposing relationship to the magnet rotor 28 with an axial air gap left therebetween.

It is to be noted that since the axial-flow fan motor 12 of the arrangement shown has 4 magnet poles as illustratively shown in FIG. 16, it is necessary to locate the position-detecting element 29 at a position opposing one of the magnetically active conductor portions 22a, 22b and 23a, 23b of the armature coils 22 and 23. However, since provision of the position-detecting element 29 at a position on an upper face of one of the magnetically active conductor portions 22a, 22b and 23a, 23b opposing the magnet rotor 28 will increase the distance of the air gap (field air gap) by a distance equal to the thickness of the position-detecting element 29, which will make the field magnet flux weak accordingly, the disk-type single-phase brushless motor will be deteriorated in that a high torque cannot be obtained and the efficiency is low. Therefore, in the present arrangement, the single position-detecting element 29 is located at a position on the upper face of the printed circuit board 20 opposing one of the magnetically active conductor portions 22b and 23b of the armature coils 22 and 23 which do not oppose the stator yoke 21, that is, which oppose the cutaway portions 26 and 27 of the stator yoke 21. Accordingly, the position-detecting element 29 is typically located at either one of two positions indicated by broken line circles 30 and 31 in FIG. 14, and at the position, it is located between the upper face of the printed circuit board 20 and a lower face of the magnetically active conductor portion 23b or 22b of the armature coil 23 or 22 in the cutaway portion 30 or 31 of the stator yoke 21.

The magnet rotor 28 includes a field magnet having up to 2P poles (P is an integer greater than 1) wherein the north and south magnetic poles are formed in an alternate relationship with the same circumferential width of an angle of 90 degrees as illustrated in FIGS. 15 and 16, and in the arrangement shown, the magnet rotor 28 has a flattened annular profile with 4 magnetic poles. Referring to FIG. 12, the magnet rotor 28 is formed in an integral relationship with a cup-shaped body 34 of a rotary fan 33 particularly shown in FIG. 15 made of plastic material by molding with a rotor yoke 32 interposed therebetween. A plurality of impellers 17 are formed in an integral relationship on an outer circumferential periphery of the cup-shaped body 34, and when the cup-shaped body 34 is rotated, the impellers 17 will produce and send cooling air flows toward the perforations 18 below.

A hub 35 is formed at a substantially central portion of a lower face of the cup-shaped body 34, and an upper end portion of a rotary shaft 36 is secured to the hub 35 for integral rotation with the rotary fan 33.

The rotary shaft 36 is supported for rotation by means of a pair of ball bearings 38 and 39 mounted in a pair of openings at upper and lower ends of a bearing housing 37 which is formed uprightly in an integral relationship at a central portion of the motor casing 16.

A retaining ring 40 is mounted at a portion of the rotary shaft 36 spaced a little distance below the lower ball bearing 39 so that the shaft 36 may not be pulled off upwardly.

The disk-shaped single-phase brushless axial-flow fan motor 12 is useful indeed and has been reduced to practice by the assignee of the present patent application.

However, here has arisen a problem. In particular, the problem has been caused by the fact that, as such axial-flow brushless fan motors as described above have been considered as an important component of the high-density electronic appliance and has been used progressively frequently, very severe requirements have been required that, depending upon a type of the high-density electronic appliance, an axial-flow brushless fan motor be further reduced in size and/or thickness and in cost and production of noises caused by vibrational noises and resonant sounds be reduced extremely.

In the high-density electronic appliance, a large number of parts or devices which are made of various materials are installed generally within a limited area or volume. Accordingly, if a conventional disk-type single-phase brushless axial-flow fan motor incorporated in such a high-density electronic appliance is driven, depending upon a type of the high-density electronic appliance, very high noises caused by vibrational noises and resonant sounds are produced in some cases.

The conventional disk-type single-phase brushless axial-flow fan motor 12 described with reference to FIGS. 12 to 16 has been devised such that it may rotate relatively smoothly and accordingly it may not produce high turning noises nor vibrational noises while it has a single-phase energization structure, and besides a desired reluctance torque and accordingly a desired characteristic of the motor may be obtained.

The disk-type single-phase brushless axial-flow fan motor 12 does not produce such high vibrations as can be felt by a hand or in other words produces very low vibrations, and produces only very low turning noises which may or may not be caught by an ear. Accordingly, there may be little problem if the disk-type single-phase brushless axial-flow fan motor 12 is employed in an ordinary high-density electronic appliance, and in such a case, noises of vibrational noises and resonant sounds can be almost ignored. However, where such a disk-type single-phase brushless axial-flow fan motor is mounted on a casing of the high-density electronic appliance of a certain type as described above, it is a problem that high noises may sometimes be produced because vibrations of the motor are transmitted with an amplifying effect by the casing to develop high vibrating and resonant sounds.

Here, reduction in high noises of vibrational noises and resonant sounds of such a disk-type single-phase brushless axial-flow fan motor can be attained by a method disclosed in U.S. Pat. No. 4,620,139 or by another method disclosed in Japanese Utility Model Laid-Open No. 62-104565 both assigned to the applicant of the present patent application wherein one of a pair of radially extending edges of a cutaway portion of a stator yoke is inclined in a skew. However, in the conventional method, the relatively opposing area of a boundary portion of a north pole and an adjacent south pole of a magnet rotor to the radially extending edge of the cutaway portion of the stator yoke is so small that self-starting or continued rotation of the motor may not be assured depending upon the magnitude or variation of the load. This often occurs particularly where the method disclosed in U.S. Pat. No. 4,620,139 is employed, and accordingly the method has a drawback that it is low in reliability. It is to be noted that the utility model application of Japanese Utility Model Laid-Open No. 62-104565 is a basic application made for the same object with the invention of the present patent application. The invention of the utility model application is very effective in that since one of a pair of radially extending edges of a cutaway portion formed in a stator yoke is formed in a skew while the other edge extends in a radial direction, a relatively high reluctance torque can be obtained, and besides since the reluctance torque is generated in such a manner as to increase gradually comparing with the arrangement with the stator yoke 21 shown in FIG. 14 due to the presence of the edge of the cutaway portion formed in a skew, the motor can rotate smoothly and production of noises is minimized.

However, a number of high-density electronic appliances involve a member or members which are ready to resonate, and even where a disk-type single-phase brushless axial-flow fan motor is mounted on such a readily resonating member, it is further required to minimize noises caused by vibrational noises and/or resonant sounds in the motor wherein such a conventional stator yoke as disclosed in Japanese Utility Model Laid-Open No. 62-104565 is employed.

Thus, the inventors made a stator yoke wherein opposite radially extending edges of a cutaway portion therein are formed each in a skew. However, indeed the arrangement decreased production of high noises caused by vibrational noises and/or resonant sounds, but it presented a drawback that the reluctance torque is so low that, if a somewhat high load is applied to the motor by some external factor, the starting characteristic is deteriorated and in some cases self-starting and/or continued rotation is disabled.

Then, the inventors made further examination of the method of Japanese Utility Model Laid-Open No. 62-104565 in order to attain optimum designing and produced and examined several types of stator yokes wherein only one of a pair of radially extending edges of a cutaway portion is formed in a skew in different angles. However, a satisfactory result was not reached in regard to reduction in noises caused by resonant sounds and vibrational noises nor in regard to the magnitude of the reluctance torque obtained.

It has been found, however, that the shape of a cutaway portion of a stator yoke has a considerable effect on the characteristics of the motor although the matter is delicate.

SUMMARY OF THE INVENTION

It is an object of the present invention to provide a disk-type single-phase brushless motor wherein a reluctance torque having a sufficient magnitude can be generated to assure self-starting and continued rotation of the motor and production of disagreeable noises caused by vibrational noises and/or resonant sounds can be minimized so that they can little be noticed by an ear even where the motor is mounted on a readily resonating member such as a casing of the high-density electronic appliance.

In order to attain the object, according to the present invention, there is provided a disk-type single-phase brushless motor which comprises a rotor supported for rotation and including a field magnet having 2P alternate north and south poles of essentially equal circumferential pole width $\theta$, P being an integer greater than 1, a coreless stator armature including a stator yoke provided stationarily in an opposing relationship to the rotor with an axial air gap left therebetween, a printed circuit board secured to one surface of the stator yoke, and at least one coreless armature coil disposed at the same-phase positions on a surface of the stator yoke or the printed circuit, a single position-detecting element provided on the coreless stator armature for detecting a position of the rotor, and a driving circuit provided on the printed circuit board for driving the coreless stator armature, the stator yoke having at least one cutaway portion formed therein for enabling self-starting of the disk-type single-phase brushless motor, the cutaway portion of the stator yoke being defined by a first radially extending edge formed on an imaginary line passing the center of the stator yoke at an angular position of the stator yoke spaced by an angular distance of about $\theta/2$ in the direction opposite the direction of rotation of the rotor from an imaginary Y axis line which perpendicularly crosses an imaginary X axis line at the center of the stator yoke in a plane of the stator yoke to divide the stator yoke into four imaginary sections, and a second edge formed in another imaginary line which extends substantially in a parallel relationship to the imaginary X axis line from an inner radial end of the first edge to an outer circumferential periphery of the stator yoke such that the cutaway portion has an angular width of $\theta + \alpha$ at the outer ends of the first and second edges of the cutaway portion of the stator yoke, $\alpha$ being an angle smaller than $\theta/2$, the stator yoke being positioned relative to the coreless armature coil such that the first radially extending edge of the cutaway portion thereof is located at a position spaced by an angular distance of an angle between $\theta/6$ and $\theta/3$ either from a position at which a maximum starting torque is produced or from one of the same-phase positions in the direction opposite the direction of rotation of the rotor.

With the disk-type single-phase brushless motor, noises caused by vibrational noises and resonant sounds can be minimized even where the motor is secured to a housing or a like member which is ready to resonate. Besides, energizing current through the motor is reduced. Accordingly, the disk-type single-phase brushless motor of the present invention can be employed for a disk-type single-phase brushless axial-flow fan motor of a reduced size, thickness and weight which can be advantageously incorporated in the high-density electronic appliance.

The above and other objects, features and advantages of the present invention will become apparent from the following description and the appended claims, taken in conjunction with the accompanying drawings.

DESCRIPTION OF THE PREFERRED EMBODIMENT

Figure 1:
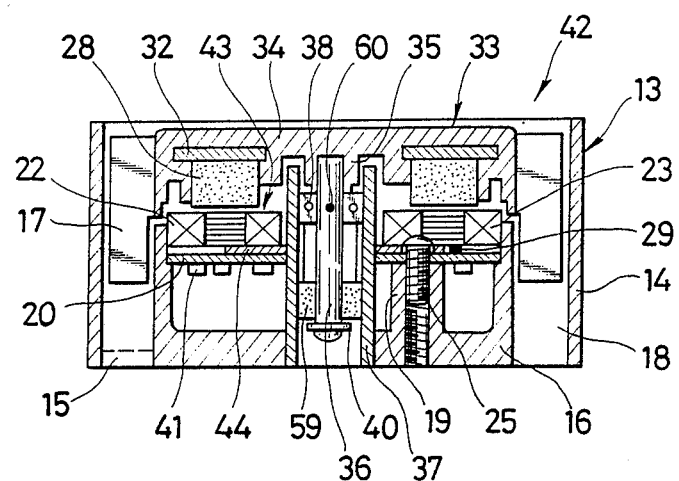
FIG. 1 is a vertical sectional view of a disk-type single-phase brushless axial-flow fan motor to which a disk-type single-phase brushless motor of an embodiment of the present invention is applied.

Referring to FIGS. 1 to 6, there is shown a disk-type single-phase brushless axial-flow fan motor to which a disk-type single-phase brushless motor of an embodiment of the present invention is applied. It is to be noted that like parts or elements are denoted by like reference numerals to those of the conventional coreless single-phase brushless motor described hereinabove with reference to FIGS. 7 to 16.

Referring first to FIG. 1, the disk-type single-phase brushless axial-flow fan motor generally denoted at 42 includes a body 13 including an outer casing 14 which has a substantially square shape in plan and has a hollow spacing or bore formed at a central portion thereof. The motor body 13 further includes a generally cup-shaped motor casing 16 located in the center bore of the outer casing 14 and connected to the outer casing 14 by a plurality of radially extending stays 15 (only one illustrated in FIGS. 1 and 2). The motor has a substantially channel-shaped vertical section and defines a motor receiving spacing therein. The casings 14 and 16 and stays 15 are formed as a unitary member from plastic material and define thereamong a plurality of perforations 18 through which air flows produced by impellers 17.

Figure 2:
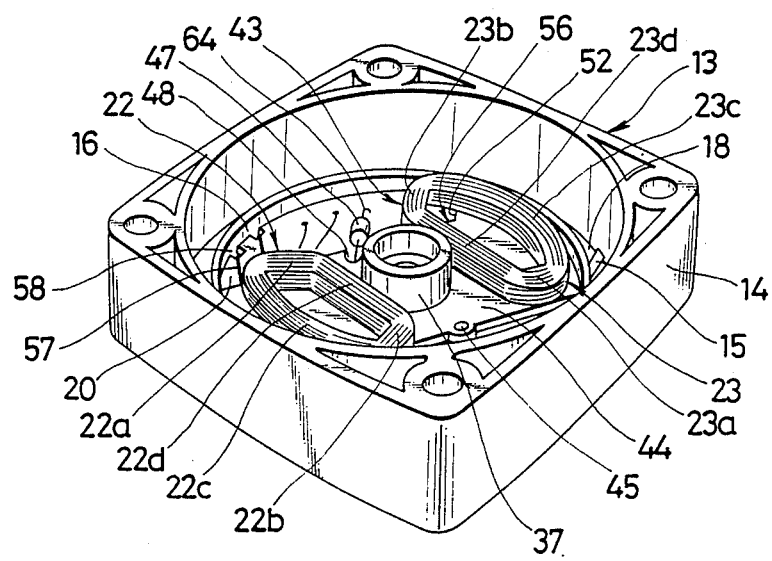
FIG. 2 is a perspective view, as viewed from above, of a body of the axial-flow fan motor of FIG. 1 on which a coreless stator armature is mounted.
Figure 3:
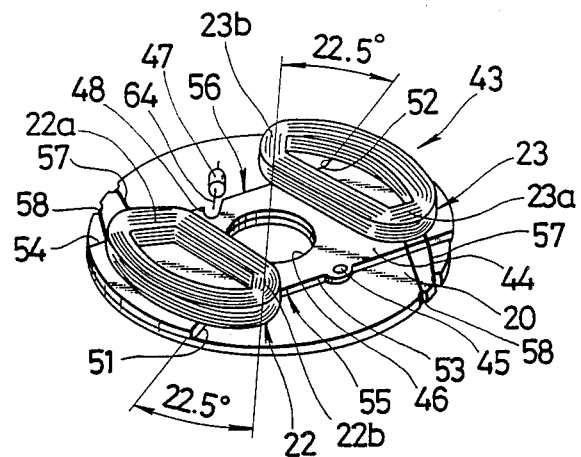
FIG. 3 is a perspective view of the coreless stator armature to be mounted on the motor body of FIG. 2.
Figure 4:
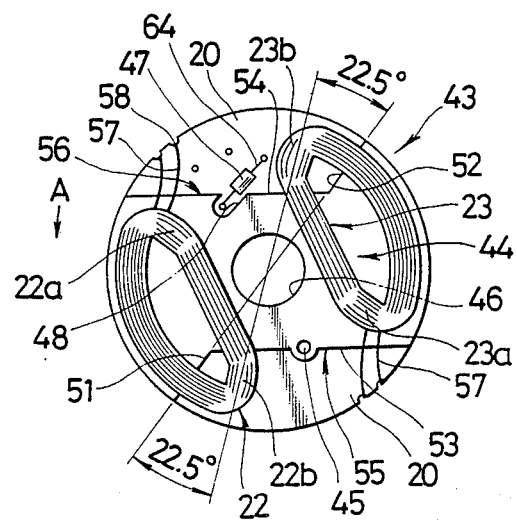
FIG. 4 is a plan view of the coreless stator armature of FIG. 3.
Figure 5:
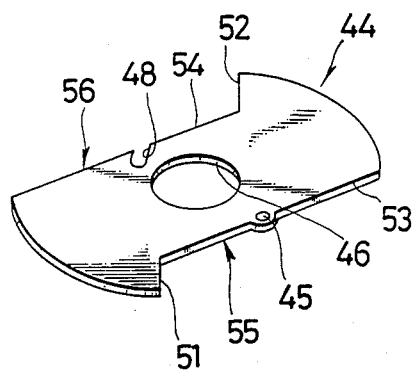
FIG. 5 is a perspective view, as viewed from above, of a stator yoke employed in the coreless stator armature of FIG. 3.

A pair of support posts are formed uprightly in an integral relationship on the bottom of the motor casing 16 with a plastic material. In the case of disk-type single-phase brushless fan motor 42 of the embodiment shown, the size thereof is so small as 42 mm wide and long and 10 to 20 mm thick that provision only of the single support post 19 is sufficient. Referring also to FIGS. 2 to 4, a coreless stator armature 43 is secured to the top of the support post 19 by means of a screw 25 made of a non-magnetic substance. A perforation 45 is formed in a stator yoke 44, and as the coreless stator armature 43 is secured to the top of the support post 19 by means of the screw 25, the screw 25 is extended through the perforation 45.

The coreless stator armature 43 includes a printed circuit board 20 having such a configuration as shown in FIGS. 2 and 3 and located at the top of the support post 19, and the stator yoke 44 having such a configuration as shown in FIGS. 2 to 4 and 6 and secured in a closely contacting relationship to an upper face of the printed circuit board 20. The coreless stator armature 43 further includes a pair of coreless armature coils 22 and 23 secured, as seen in FIGS. 2 and 4, at two same-phase positions spaced in an antipodal relation on an upper face of the stator yoke 44 by suitable means such as adhesion in a similar manner to those of the arrangement shown in FIG. 14.

The stator yoke 44 has formed at a central portion thereof a perforation 46 through which a bearing housing 37 and a rotary shaft 36 extend. The stator yoke 44 further has formed adjacent the perforation 46 therein a small recess 48 for leading out therethrough one of a pair of terminals 64 of a resistor 47 to the lower face side of the printed circuit board 20 under the stator yoke 44.

Figure 16:
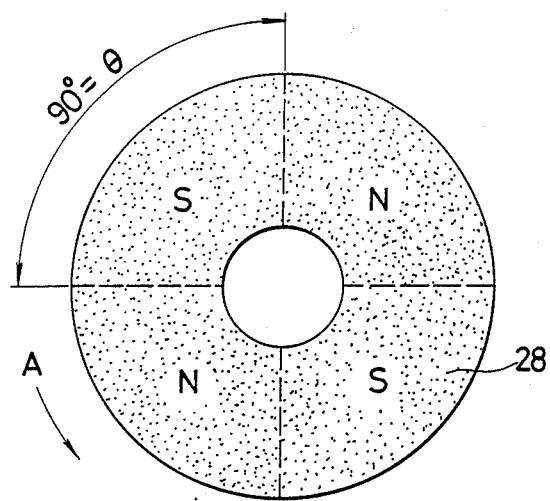
FIG. 16 is an illustrative bottom plan view of a magnet rotor of the motor of FIG. 12.

The stator yoke 44 is required to have a cutaway portion of a specific shape formed therein for enabling generation of a reluctance torque by which a rotary fan 33 having thereon such a magnet rotor 28 as shown in FIG. 16 can start itself and continue its rotation in a predetermined direction. As shown in FIG. 1, the magnet rotor 28 is formed in a cup-shaped body 34 of the rotary fan 33, with a rotor yoke 32 interposed therebetween.

A hub 35 is formed at a substantially central portion of a lower face of the cup-shaped body 34, and an upper end portion of the rotary shaft 36 is secured to the hub 35 for rotation as a unit with the rotary fan 33.

Electronic parts 41 in the form of chips constituting a driving circuit are mounted on a lower face of the printed circuit board 20 located on a lower face of the stator yoke 21 while the two coreless armature coils 22 and 23 and a single position-detecting element 29 such as a Hall effect element are mounted on an upper face of the stator yoke 21. The armature coils 22 and 23 and the position-detecting element 29 constitute the coreless stator armature 24 and are disposed for relative rotation in a face-to-face opposing relationship to the magnet rotor 28 with an axial air gap left therebetween. The position-detecting element 29 serves to detect one of the north and south poles of the magnet rotor 2 in order to enable the single-phase brushless motor of a coreless structure to start itself.

In particular, the stator yoke 44 has a pair of cutaway portions 55 and 56 of a specific shape formed therein. Details of the cutaway portions 55 and 56 will now be described in detail with reference to FIG. 6 (also see FIGS. 2 through 5).

Figure 6:
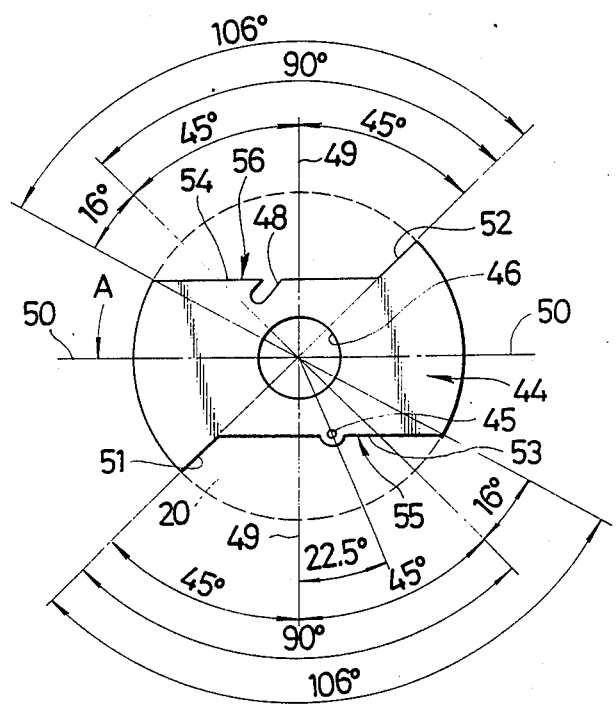
FIG. 6 is a top plan view of the stator yoke of FIG. 5.
Figure 7:
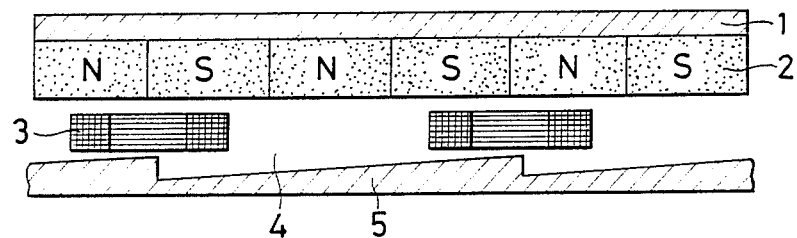
FIG. 7 is a developed illustrative view of a rotor and a stator of a coreless single-phase brushless motor illustrating a conventional means for generating a reluctance torque.
Figure 8:
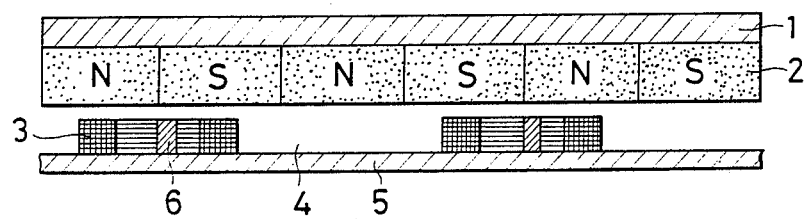
FIG. 8 is a similar view but illustrating another conventional means for generating a reluctance torque.
Figure 9:
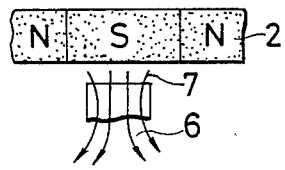
FIG. 9 is an illustrative view of part of the motor of FIG. 8 illustrating a magnetic flux around the reluctance torque generating means.
Figure 10:
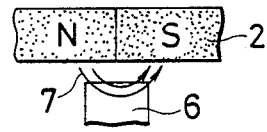
FIG. 10 is a similar view but illustrating a magnetic flux around a dead point of the motor of FIG. 8.
Figure 11:
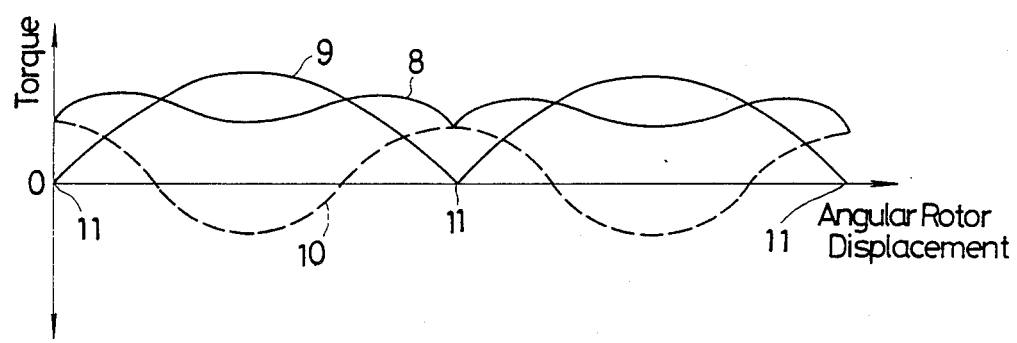
FIG. 11 is a graph illustrating a composite torque curve.
Figure 12:
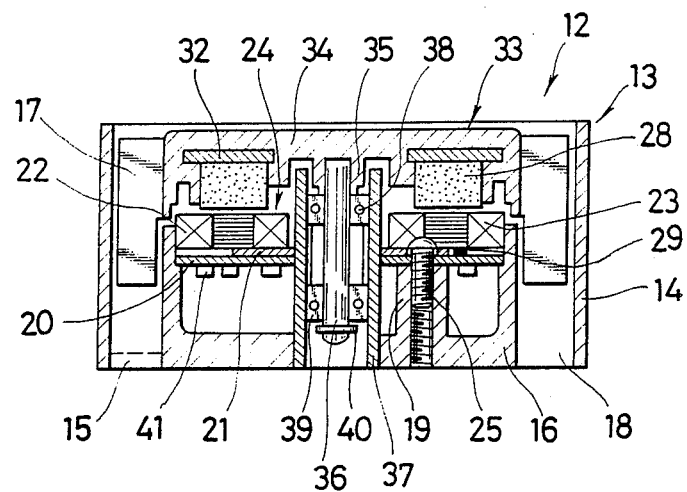
FIG. 12 is a vertical sectional view of a conventional disk-type single-phase brushless axial-flow fan motor.
Figure 13:
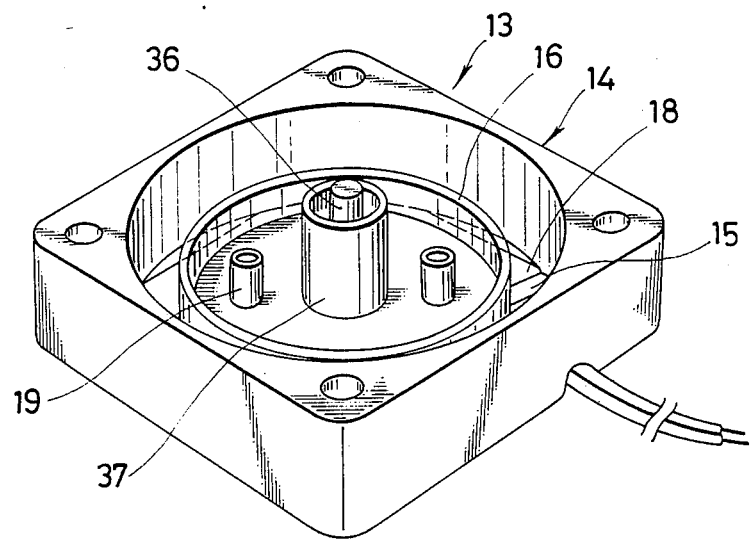
FIG. 13 is a perspective view of a body of the single-phase brushless axial-flow fan motor of FIG. 12.
Figure 14:
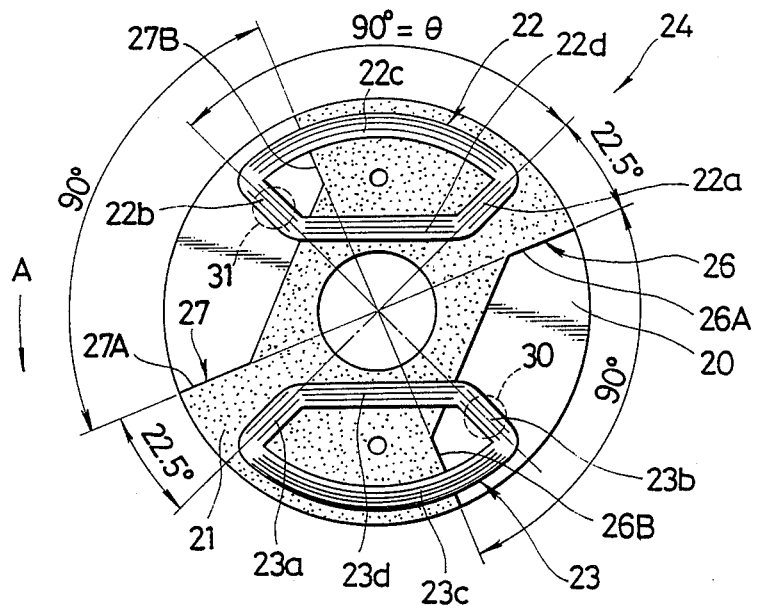
FIG. 14 is a top plan view of a coreless stator armature of the motor of FIG. 12.
Figure 15:
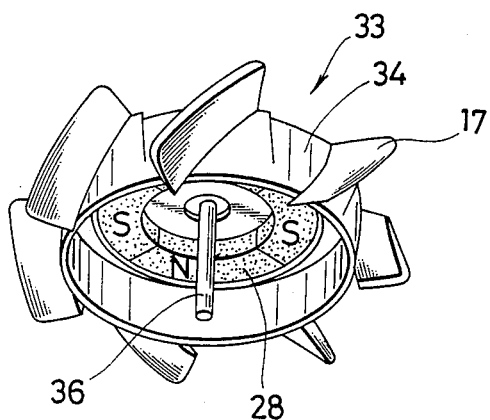
FIG. 15 is a perspective view of a rotary fan of the motor of FIG. 12.

In FIG. 6, two arcs of broken lines indicate portions of an outer circumferential periphery of the printed circuit board 20 which do not coincide with solid curved lines of a pair of circumferential edges of the stator yoke 44, and the stator yoke 44 is secured to the upper face of the printed circuit board 20 by a suitable means such as adhesion as described above. As seen in FIG. 6, the stator yoke 44 is imaginarily divided into four sections in a plane by an imaginary Y axis line 49 drawn in a long and short dash line and an imaginary X axis line 50 also drawn in a long and short dash line which crosses the imaginary Y axis line 49 perpendicularly at the center of the stator yoke 44. In this condition, where each magnet pole of the 4-pole magnet rotor 28 has an angular or circumferential width of $\theta$, first radially extending edges 51 and 52 passing the center of the stator yoke 44 are formed at positions of the stator yoke 44 spaced by an angular distance of $\theta/2$, that is, by an angle of 45 degrees because each magnetic pole of the 4-pole magnet rotor 28 has a mechanical angular width of 90 degrees, in the direction opposite the direction of rotation of the 4-pole magnet rotor 28 shown in FIG. 16, that is, in the direction opposite the direction indicated by the arrow mark A in FIG. 16 from the imaginary Y axis line 49. Meanwhile, second edges 53 and 54 are formed such that they extend in a parallel relationship to the imaginary X axis line 50 in the direction of the arrow mark A from suitably selected radially inner ends of the first edges 51 and 52, respectively, to the outer circumferential edges of the stator yoke 44. Consequently, a pair of cutaway portions 55 and 56 which are spaced from each other in an antipodal relation and have an angular or circumferential width of $\theta + \alpha$ ($\alpha$ is an angle smaller than $\theta/2$) at the outer ends of the first edges 51 and 52 and the corresponding second edges 53 and 54 are formed in the stator yoke 44. In the embodiment shown, the angle $\alpha$ is 16 degrees, and accordingly, the angular or circumferential width of the cutaway portions 55 and 56 formed in the stator yoke 44 is 106 degrees.

Referring back to FIGS. 2 to 4, the upper face of the stator yoke 44 is processed for insulation, and the two coreless armature coils 22 and 23 are located at symmetrical positions on the stator yoke 44 with respect to the center of the stator yoke 44 as seen in FIGS. 2 to 4. In order for the disk-type single-phase brushless axial-flow fan motor 42 to have a most desirable performance, the two armature coils 22 and 23 are mounted on the stator yoke 44 in a following manner. In particular, referring specifically to FIG. 4, the armature coils 22 and 23 are secured to the upper face of the stator yoke 44 by a suitable means such as an adhesive tape or a bonding agent such that radially extending magnetically conductive portions 22b and 23b (or more particularly the center lines of the same) of the armature coils 22 and 23 may be located at positions spaced by an angular distance of about one fourth of each pole width or $\theta/4$, that is, by an angle of about 22.5 degrees in the direction of rotation of the magnet rotor 28 (direction of the arrow mark A) from the first radially extending edges 51 and 52 of the cutaway portions 55 and 56 formed in the stator yoke 44, respectively.

Terminals 57 of the armature coils 22 and 23 located on the stator yoke 44 are passed through respective notches 58 formed on the outer circumferential edge of the printed circuit board 20 and are soldered to a printed conductor pattern not shown formed on the lower face of the printed circuit board 20 so as to establish electric connection therebetween. Also the resistor 47 has its terminals 64 soldered to the printed conductor pattern on the printed circuit board 20 so as to establish electric connection therebetween.

It is to be noted that, in the disk-type single-phase brushless axial-flow fan motor 42 of the present invention, the rotary shaft 36 is supported for rotation by means of a ball bearing 38 and a plain bearing 59 provided at upper and lower portions of the bearing housing 37 formed in the motor casing 16 as shown in FIG. 1.

In this manner, a ball bearing is employed for the bearing 38 while a plain bearing is employed for the other bearing 59. This is intended to reduce the cost of the disk-type single-phase brushless axial-flow fan motor 42 by reducing the quantity of ball bearings used which are generally more expensive than plain bearings. However, in the case of the present embodiment, the employment of a single ball bearing instead of two ball bearings will not deteriorate the reliability of the motor 42. The reason will be described below.

According to resulted data of examinations and experiments which were conducted by the inventors, most of the force applied to a bearing particularly of an axial-flow fan motor such as the disk-type single-phase brushless axial-flow fan motor 42 wherein the so-called direct drive system is employed, is a radial load originating in displacement of the center of gravity of the rotary fan 33 from the rotary shaft 36.

However, conventional axial-flow fan motors have ignored the fact described just above and only replace one of two ball bearings with a plain bearing. Consequently, a long life and a high reliability were not able to be attained.

To the contrary, in the case of the present invention, the point of application of a force to a bearing of the disk-type single-phase brushless axial-flow fan motor 42 is the center of gravity of the rotary fan 33, and accordingly the ball bearing 38 is provided at a portion of the rotary shaft 36 at the location 60 of the center of gravity of the rotary fan 33 (the gravity center of the rotor) so that it may receive most part of a radial load to the rotary shaft 36.

However, the mere arrangement of the ball bearing 38 may not perfectly eliminate oscillating movements of the rotary shaft 36. In the embodiment shown, the plain bearing 59 is therefore provided at the opening at the lower end of the bearing housing 37 remote from the ball bearing 38 so that the plain bearing 59 may receive only loads which may be caused by oscillating movements of the rotary shaft 36.

Indeed a radial load may be applied to the plain bearing 59 if the direction of rotation of the rotary fan 33 is reversed, but such reversing of the rotational direction of the rotary fan 33 does not actually occur in the case of the axial-flow fan motor 42, and accordingly, little abrasion and little deterioration in reliability will occur.

Thus, in order for the ball bearing 38 to receive most part of a load originating from some eccentricity of the rotary fan 33, it is mounted at an upper opening end portion of the bearing housing 37 at the center 60 of gravity of the rotary fan 33 for supporting the rotary shaft 36 for rotation thereon.

A retaining ring 40 which is inexpensive and easy to assemble is mounted at a location on the rotary shaft 36 spaced a little distance below the plain bearing 59 for preventing the rotary fan 33 from letting off upwardly from the bearing housing 37.

It is to be noted that a radial load will be caused by a magnetic attracting force between the magnet rotor 28 and the stator yoke 44. Such a radial load is high particularly in the case of the disk-type single-phase brushless axial-flow fan motor 42 of the present embodiment.

In the bearing structure of the axial-flow fan motor 42 of the present invention, such a radial load acts effectively as a preload to the ball bearing 38. Accordingly, the necessity of an element such as a spring for exerting a preload to the ball bearing 38 can be eliminated.

Further, while the retaining ring 40 is provided in order to prevent the rotary fan 33 from being let off with certainty, normally no force is applied to the retaining ring 40 as distinct from a conventional bearing structure. Accordingly, a plastic ring or a like simple and inexpensive ring can be employed as the retaining ring 40, which is advantageous in cost and assembly.

Figure 17:
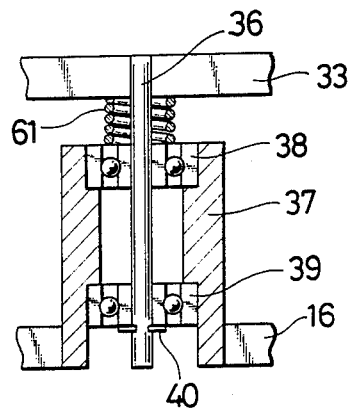
FIGS. 17 to 19 are vertical sectional views illustrating different conventional bearing structures.

The bearing structure described above is employed in the present embodiment in consideration of the facts that disk-type single-phase brushless axial-flow fan motors must be produced at a minimized cost, and that an elongated life is required and if such a common bearing structure which employs two ball bearings 38 and 39 as shown in FIG. 17 in order to meet the reliability, for example, over ten thousand hours, the cost will be too high.

Here, the bearing structure shown in FIG. 17 will be described. Referring to FIG. 17, a rotary fan 33 is mounted at an upper portion of a rotary shaft 36. The rotary shaft 36 is supported for rotation by means of a pair of ball bearings 38 and 39.

The ball bearings 38 and 39 are mounted at opposite upper and lower opening end portions of a cylindrical bearing housing 37 formed uprightly on a cup-shaped motor casing 16. A compression coil spring 61 is interposed between the rotary fan 33 and the upper ball bearing 38 for applying a preload to the ball bearing 38. By the preload of the spring 61, the ball bearing 39 is pressed against a retaining ring 40 which is mounted at a lower end portion of the rotary shaft 36 below the ball bearing 39 for preventing the rotary shaft 36 from letting off upwardly.

Figure 18:
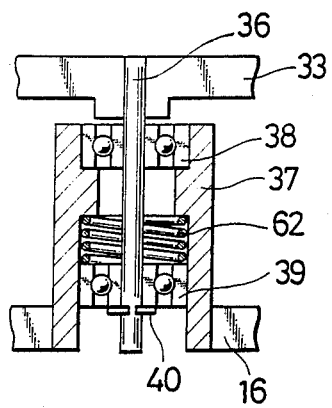

Another known bearing structure is shown in FIG. 18 wherein a spring 62 for exerting a preload is interposed between a pair of ball bearings 38 and 39.

However, both bearing structures shown in FIGS. 17 and 18 require two expensive ball bearings (38 and 39) as well as a spring (61 or 62) for applying a preload to one of the ball bearings, an expensive retaining ring (40) and some other parts, and require a relatively great number of man-hours in assembling such parts, which raises the cost of a disk-type single-phase brushless fan motor.

It is to be noted that while plain bearings such as an oil impregnated sintered metal (oilless metal) bearing are known as inexpensive bearings, if such a plain bearing is employed in a disk-type single-phase brushless fan motor of a coreless structure, the fan motor can be reduced in weight and thickness, but its life and reliability will be deteriorated by abrasion caused at the bearing by a radial load applied to the bearing due to some eccentricity of the rotary shaft and so on.

It is to be added that while an experiment was conducted with a bearing structure which had been made employing a plain bearing in the form of an oil impregnated sintered metal bearing in place of one of two ball bearings in order to obtain a less expensive bearing structure, the bearing structure was not able to attain a long life and was short in life and low in reliability due to significant abrasion caused by eccentricity of the rotor and so on comparing with a bearing structure which employs two ball bearings therein.

This will be described now with reference to FIG. 19. In particular, in a bearing structure shown in FIG. 19, the ball bearing 38 at the upper location in FIG. 17 is replaced with a plain bearing 63 in the form of an inexpensive oil impregnated sintered metal bearing.

Figure 19:
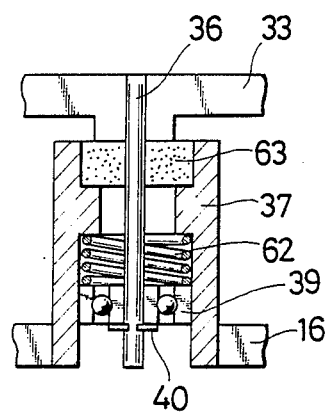

With the bearing structure shown in FIG. 19, the cost is reduced indeed because an expensive ball bearing such as the ball bearing 38 is eliminated. However, in the bearing structure, the load of a rotary fan 33 is applied to the plain bearing 63 as apparently seen in FIG. 19. Accordingly, even if the plain bearing 63 can temporarily suppress oscillating movement of a rotary shaft 36 caused by eccentricity of the rotary fan 33, it is only for a short period of time, and as time passes, the plain bearing 63 will be abraded. Therefore, even if a ball bearing 39 provided at the lower end portion of the rotary shaft 36 operates effectively, the burden is shared only by the ball bearing 39. Consequently, the ball bearing 39 cannot achieve its essential function as a bearing of a high performance, and besides the ball bearing 39 at the location cannot suppress oscillating movement of the rotary shaft 39. Further, since the life of the ball bearing 39 is reduced, the performance thereof cannot be maintained for a long period of time, and a high performance and a long life cannot be anticipated. Moreover, the bearing structure has a drawback that, as the disk-type single-phase brushless axial-flow fan motor employing the bearing structure is used, the ball bearing 39 is deteriorated and consequently high noises will be produced by high fluttering sounds by the ball bearing 39 upon rotation of the motor.

As described above, only replacement of one of two ball bearings with a plain bearing such as an oil impregnated sintered metal bearing for the object of reduction in cost cannot attain such a long life and a high reliability as in a bearing structure employing two ball bearings.

To the contrary, with the embodiment of the present invention, such drawbacks of the conventional bearing structures are eliminated by provision of the plain bearing 59 at the location of the specific conditions described above.

For comparison, the disk-type single-phase brushless axial-flow fan motor 42 of the present invention employing the stator yoke 44 of the embodiment and the conventional disk-type single-phase brushless axial-flow fan motor 12 of FIGS. 12 to 16 employing the coreless stator armature 24 constructed using the conventional stator yoke 21 were tested. In particular, for both the disk-type single-phase brushless axial-flow fan motors 42 and 12, the magnet rotor 28 of the rotary fan 33 mounted on the cup-shaped motor casing 16 of the motor body 13 was rotated relative to the coreless stator armature 43 or 24 mounted at the top end or ends of the support post or posts 19.

Here, the conditions for measurement were common to the two motors 42 and 12. However, because it was phase brushless axial-flow fan motors 42 and 12 may have some fluctuations depending upon the armature coils 23 and 22 actually used, the tests were made for the rotational speed of 7,000±700 rpm and the energizing current of 120 to 140 mA.

Results of the measurement of the disk-type single-phase brushless axial-flow fan motor 12 (No. 1 to 5) employing the conventional stator yoke 21 are indicated in Table 1 below.

TABLE 1

Results of Measurement of Single-Phase Brushless Axial-Flow Fan Motor 12 with Conventional Stator Yoke 21

| No. | Rotational Speed (rpm) | Current (mA) | Noise Level (dB) *1 | Noise Level (dB) *2 |
| --- | --- | --- | --- | --- |
| 1 | 7,810 | 143 | 48 | 65 |
| 2 | 7,090 | 123 | 46 | 65 |
| 3 | 6,860 | 128 | 45 | 63 |
| 4 | 7,350 | 139 | 49 | 63 |
| 5 | 7,190 | 137 | 48 | 62 |

Results of the measurement of the disk-type single-phase brushless axial-flow fan motor 42 (No. 6 to 9) employing the stator yoke 44 of the embodiment are indicated in Table 2 below.

TABLE 2

Results of Measurement of Single-Phase Brushless Axial-Flow Fan Motor 42 with Stator Yoke 44 of the Embodiment

| No. | Rotational Speed (rpm) | Current (mA) | Noise Level (dB) *1 | Noise Level (dB) *2 |
| --- | --- | --- | --- | --- |
| 6 | 6,890 | 141 | 48 | 60 |
| 7 | 7,130 | 139 | 48 | 61 |
| 8 | 7,240 | 137 | 48 | 62 |
| 9 | 7,080 | 134 | 46 | 60 |

Here, *1 indicates noise levels where the disk-type single-phase brushless axial-flow fan motor 12 or 42 is secured to a fixing plate which is hard to produce resonant sounds; and
*2 indicates noise levels wherein the disk-type single-phase brushless axial-flow fan motor 12 or 42 is secured to a plastic plate which has legs attached thereto and is ready to resonate.

Depending upon Table 1 and Table 2 above, comparison between the disk-type single-phase brushless axial-flow fan motor 12 employing the conventional stator yoke 21 and the disk-type single-phase brushless axial-flow fan motor 44 employing the stator yoke 44 of the embodiment reveals following facts:

Rotational Speed

A. In the case of the disk-type single-phase brushless axial-flow fan motor 12 employing the conventional stator yoke 21:
Average values for the 5 samples of No. 1 to No. 5
Rotational speed: 7,260 rpm
$\sigma$: 317.6 rpm
$2\Delta\sigma$: 762 rpm B. In the case of the disk-type single-phase brushless axial-flow fan motor 42 employing the stator yoke 44 of the embodiment:
Average values for the 4 samples of No. 6 to No. 9
Rotational speed: 7,085 rpm
$\sigma$: 113 rpm
$2\Delta\sigma$: 271.2 rpm Comparison in rotational speed reveals that, comparing with the disk-type single-phase brushless axial-flow fan motor 12 employing the conventional stator yoke 21, the disk-type single-phase brushless axial-flow fan motor 42 employing the stator yoke 44 of the embodiment exhibits a reduced rotational speed, which results in reduction in production of noises caused by vibrational noises or resonant sounds.

Electric Current

A. In the case of the disk-type single-phase brushless axial-flow fan motor 12 employing the conventional stator yoke 21:
Average values for the 5 samples of No. 1 to No. 5
Electric current: 134 mA
$\sigma$: 7.37 mA
$2\Delta\sigma$: 17.69 mA B. In the case of the disk-type single-phase brushless axial-flow fan motor 42 employing the stator yoke 44 of the embodiment:
Average values for the 4 samples of No. 6 to No. 9
Electric current: 137.75 mA
$\sigma$: 2.59 mA
$2\Delta\sigma$: 6.22 mA Thus, as for electric current, comparing with the disk-type single-phase brushless axial-flow fan motor 12 employing the conventional stator yoke 21, the disk-type single-phase brushless axial-flow fan motor 42 employing the stator yoke 44 of the embodiment requires only a very low current flow as determined from the standard deviation values.

Noise Levels in the Case of *1

A. In the case of the disk-type single-phase brushless axial-flow fan motor 12 employing the conventional stator yoke 21:
Average values for the 5 samples of No. 1 to No. 5
Noise Level: 47.2 dB
$\sigma$: 1.47 dB
$2\Delta\sigma$: 3.53 dB B. In the case of the disk-type single-phase brushless axial-flow fan motor 42 employing the stator yoke 44 of the embodiment:
Average values for the 4 samples of No. 6 to No. 9
Noise Level: 47.5 dB
$\sigma$: 0.87 dB
$2\Delta\sigma$: 2.09 dB Comparison reveals, on one hand, that the original noise level of the disk-type single-phase brushless axial-flow fan motor 12 employing the conventional stator yoke 21 secured to a fixing member which is hard to resonate is lower than that of the disk-type single-phase brushless axial-flow fan motor 42 employing the stator yoke 44 of the embodiment, and on the other hand, that the disk-type single-phase brushless axial-flow fan motor 42 employing the stator yoke 44 of the embodiment is nevertheless reduced in noise level by a far greater amount from the point of view of the standard deviation values ($\sigma$ values). Thus, in the case of the disk-type single-phase brushless axial-flow fan motor 42, noises of such a low level that they can be hardly caught by an ear of a man are produced.

Noise Levels in the Case of *2

A. In the case of the disk-type single-phase brushless axial-flow fan motor 12 employing the conventional stator yoke 21:
Average values for the 5 samples of No. 1 to No. 5
Noise Level: 63.6 dB
$\sigma$: 1.2 dB
$2\Delta\sigma$: 2.88 dB B. In the case of the disk-type single-phase brushless axial-flow fan motor 42 employing the stator yoke 44 of the embodiment:
Average values for the 4 samples of No. 6 to No. 9
Noise Level: 61.25 dB
$\sigma$: 1.3 dB
$2\Delta\sigma$: 3.12 dB Comparison reveals that, while the original noise level is very high with the disk-type single-phase brushless axial-flow fan motor 12 employing the conventional stator yoke 21 secured to a fixing member which is ready to resonate, and the noise level is reduced significantly with the disk-type single-phase brushless axial-flow fan motor 42 employing the stator yoke 44 of the embodiment.

In either case, the evaluation of noises was made ignoring pure hurtling noises caused by the impellers of the fan motors.

It is to be noted that a standard deviation is determined by a following expression:

$$\text{Standard Deviation} = \text{Average of Sum Total of (Deviation)}^2$$
$$= \frac{\text{Sum Total of (Deviation)}^2}{\text{Number of Total Occurrences}}$$

and the calculation proceeds as follows:
(1) Calculate the average of sample values,
(2) Calculate deviations for the individual sample values,
(3) Square the individual deviations,
(4) Divide the sum total of the results of (3) above by the number of total occurrences to obtain the average of the square values of the deviations, and
(5) Calculate the positive square root of the result of (4) above.

By the calculations of the steps (1) to (5) above, a standard deviation is obtained.

Based on the data shown in Table 1 and Table 2, a conclusion may be derived as indicated in Table 3 below.

TABLE 3

| | Fluctuation with Yoke 21 | Fluctuation with Yoke 44 |
|---|---|---|
| Rotational Speed | Great | Small |
| Electric Current | Great | Small |
| *1 Noise | Great | Small |
| *2 Noise | Small | Small |

As can be apparently seen from Table 3 above, the disk-type single-phase brushless axial-flow fan motor 42 employing the stator yoke 44 of the embodiment is generally reduced in fluctuation comparing with the disk-type single-phase brushless axial-flow fan motor 12 employing the conventional stator yoke 21. Accordingly, disk-type single-phase brushless axial-flow fan motors of a uniform quality can be provided certainly with a high degree of probability. Besides, as can be seen from the average values of the noises in the case of *2, where the stator yoke 44 of the embodiment is employed, the noise level is reduced by 2.55 dB or so. Accordingly, it is apparent that, where the motor is mounted on a housing of a material which is ready to resonate, resonant sounds and vibrational noises which make noises are very low, and therefore such disagreeable noises which have been a conventional problem are not produced.

It is to be noted that while in the embodiment described above the stator yoke 44 is located on the upper face of the printed circuit 20, it is possible to reverse their positions relative to each other.

Having now fully described the invention, it will be apparent to one of ordinary skill in the art that many changes and modifications can be made thereto without departing from the spirit and scope of the invention as set forth herein.

What is claimed is:

1. A disk-type single-phase brushless motor, comprising a rotor supported for rotation and including a field magnet having 2P alternate north and south poles of essentially equal circumferential pole width $\theta$, P being an integer greater than 1, a coreless stator armature including a stator yoke provided stationarily in an opposing relationship to said rotor with an axial air gap left therebetween, a printed circuit board secured to one surface of said stator yoke, and at least one coreless armature coil disposed at the same-phase positions on a surface of said stator yoke or said printed circuit, a single position-detecting element provided on said coreless stator armature for detecting a position of said rotor, and a driving circuit provided on said printed circuit board for driving said coreless stator armature, said stator yoke having at least one cutaway portion formed therein for enabling self-starting of said disk-type single-phase brushless motor, said cutaway portion of said stator yoke being defined by a first radially extending edge formed on an imaginary line passing the center of said stator yoke at an angular position of said stator yoke spaced by an angular distance of about $\theta/2$ in the direction opposite the direction of rotation of said rotor from an imaginary Y axis line which perpendicularly crosses an imaginary X axis line at the center of said stator yoke in a plane of said stator yoke to divide said stator yoke into four imaginary sections, and a second edge formed in another imaginary line which extends substantially in a parallel relationship to said imaginary X axis line from an inner radial end of said first edge to an outer circumferential periphery of said stator yoke such that said cutaway portion has an angular width of $\theta+\alpha$ at the outer ends of said first and second edges of said cutaway portion of said stator yoke, $\alpha$ being an angle smaller than $\theta/2$, said stator yoke being positioned relative to said coreless armature coil such that said first radially extending edge of said cutaway portion thereof is located at a position spaced by an angular distance of an angle between $\theta/6$ and $\theta/3$ from a position at which a maximum starting torque is produced.

2. A disk-type single-phase brushless motor as claimed in claim 1, further comprising a stationary motor body, a rotary fan supported for rotation on said motor body and having said rotor for integral rotation thereon, and a motor accommodating member located in said motor body and connected to said motor body by means of a plurality of stays, said coreless stator armature, said position-detecting element and said driving circuit being accommodated in said motor accommodating member.

3. A disk-type single-phase brushless motor as claimed in claim 1, wherein said stator yoke is positioned relative to said coreless armature coil such that said first radially extending edge of said cutaway portion thereof is located at a position spaced by an angular distance substantially equal to $\theta/4$ from the position at which a maximum starting torque is produced.

4. A disk-type single-phase brushless motor as claimed in claim 1, wherein said stator yoke has a plurality of cutaway portions formed at equal angular intervals at the same-phase positions thereof.

5. A disk-type single-phase brushless motor as claimed in claim 4, wherein said stator yoke has a pair of cutaway portions formed at the same-phase positions thereof spaced in an antipodal relation from each other.

6. A disk-type single-phase brushless motor as claimed in claim 1, wherein a rotary shaft for said rotor is supported for rotation at a position of the center of gravity of said rotor by means of a ball bearing while an end of said rotary shaft remote from said ball bearing is supported for rotation by means of a plain bearing.

7. A disk-type single-phase brushless motor as claimed in claim 6, wherein a preload is applied to said ball bearing by a magnetically attracting force between said field magnet of said rotor and said stator yoke without using a spring.

8. A disk-type single-phase brushless motor as claimed in claim 1, wherein said stator yoke is positioned relative to said coreless armature coil such that said first radially extending edge of said cutaway portion thereof is located at a position spaced by an angular distance substantially equal to $\theta/4$ from one of the same phase positions in the direction opposite the direction of rotation of said rotor.

9. A disk-type single-phase brushless axial-flow fan motor, comprising a stationary motor body, a rotary fan supported for rotation on said motor body and having a rotor for integral rotation thereon, said rotor including a field magnet having 2P alternate north and south poles of essentially equal circumferential pole width $\theta$, P being an integer greater than 1, a motor accommodating member located in said motor body and connected to said motor body by means of a plurality of stays, a coreless stator armature accommodated in said motor accommodating member and including a stator yoke provided in an opposing relationship to said rotor with an axial air gap left therebetween, a printed circuit board secured to one surface of said stator yoke, and at least one coreless armature coil disposed at the same-phase positions on a surface of said stator yoke or said printed circuit, a single position-detecting element provided on said coreless stator armature in said motor accommodating member for detecting a position of said rotor, and a driving circuit accommodated in said motor accommodating member and provided on said printed circuit board for driving said coreless stator armature, said stator yoke having at least one cutaway portion formed therein for enabling self-starting of said disk-type single-phase brushless motor, said cutaway portion of said stator yoke being defined by a first radially extending edge formed on an imaginary line passing the center of said stator yoke at an angular position of said stator yoke spaced by an angular distance of about $\theta/2$ in the direction opposite the direction of rotation of said rotor from an imaginary Y axis line which perpendicularly crosses an imaginary X axis line at the center of said stator yoke in a plane of said stator yoke to divide said stator yoke into four imaginary sections, and a second edge formed in another imaginary line which extends substantially in a parallel relationship to said imaginary X axis line from an inner radial end of said first edge to an outer circumferential periphery of said stator yoke such that said cutaway portion has an angular width of $\theta + \alpha$ at the outer ends of said first and second edges of said cutaway portion of said stator yoke, $\alpha$ being an angle smaller than $\theta/2$, said stator yoke being positioned relative to said coreless armature coil such that said first radially extending edge of said cutaway portion thereof is located at a position spaced by an angular distance of an angle between $\theta/6$ and $\theta/3$ from a position at which a maximum starting torque is produced.

10. A disk-type single-phase brushless motor, comprising a rotor supported for rotation and including a field magnet having 2P alternate north and south poles of essentially equal circumferential pole width $\theta$, P being an integer greater than 1, a coreless stator armature including a stator yoke provided stationarily in an opposing relationship to said rotor with an axial air gap left therebetween, a printed circuit board secured to one surface of said stator yoke, and at least one coreless armature coil disposed at the same-phase positions on a surface of said stator yoke or said printed circuit, a single position-detecting element provided on said coreless stator armature for detecting a position of said rotor, and a driving circuit provided on said printed circuit board for driving said coreless stator armature, said stator yoke having at least one cutaway portion formed therein for enabling self-starting of said disk-type single-phase brushless motor, said cutaway portion of said stator yoke being defined by a first radially extending edge formed on an imaginary line passing the center of said stator yoke at an angular position of said stator yoke spaced by an angular distance of about $\theta/2$ in the direction opposite the direction of rotation of said rotor from an imaginary Y axis line which perpendicularly crosses an imaginary X axis line at the center of said stator yoke in a plane of said stator yoke to divide said stator yoke into four imaginary sections, and a second edge formed in another imaginary line which extends substantially in a parallel relationship to said imaginary X axis line from an inner radial end of said first edge to an outer circumferential periphery of said stator yoke such that said cutaway portion has an angular width of $\theta + \alpha$ at the outer ends of said first and second edges of said cutaway portion of said stator yoke, $\alpha$ being an angle smaller than $\theta/2$, said stator yoke being positioned relative to said coreless armature coil such that said first radially extending edge of said cutaway portion thereof is located at a position spaced by an angular distance of an angle between $\theta/6$ and $\theta/3$ from one of the same-phase positions in the direction opposite the direction of rotation of said rotor.

11. A disk-type single-phase brushless motor as claimed in claim 10, further comprising a stationary motor body, a rotary fan supported for rotation on said motor body and having said rotor for integral rotation thereof, and a motor accommodating member located in said motor body and connected to said motor body by means of a plurality of stays, said coreless stator armature, said position-detecting element and said driving circuit being accommodated in said motor accommodating member.

12. A disk-type single-phase brushless motor as claimed in claim 10, wherein said stator yoke is positioned relative to said coreless armature coil such that said first radially extending edge of said cutaway portion thereof is located at a position spaced by an angular distance substantially equal to $\theta/4$ from the position at which a maximum starting torque is produced.

13. A disk-type single-phase brushless motor as claimed in claim 10, wherein said stator yoke is positioned relative to said coreless armature coil such that said first radially extending edge of said cutaway portion thereof is located at a position spaced by an angular distance substantially equal to $\theta/4$ from one of the same phase positions in the direction opposite the direction of rotation of said rotor.

14. A disk-type single-phase brushless motor as claimed in claim 10, wherein said stator yoke has a plurality of cutaway portions formed at equal angular intervals at the same-phase positions thereof.

15. A disk-type single-phase brushless motor as claimed in claim 14, wherein said stator yoke has a pair of cutaway portions formed at the same-phase positions thereof spaced in an antipodal relation from each other.

16. A disk-type single-phase brushless motor as claimed in claim 10, wherein a rotary shaft for said rotor is supported for rotation at a position of the center of gravity of said rotor by means of a ball bearing while an end of said rotary shaft remote from said ball bearing is supported for rotation by means of a plain bearing.

17. A disk-type single-phase brushless motor as claimed in claim 16, wherein a preload is applied to said ball bearing by a magnetically attracting force between said field magnet of said rotor and said stator yoke without using a spring.

18. A disk-type single-phase brushless axial-flow fan motor, comprising a stationary motor body, a rotary fan supported for rotation on said motor body and having a rotor for integral rotation thereon, said rotor including a field magnet having 2P alternate north and south poles of essentially equal circumferential pole width $\theta$, P being an integer greater than 1, a motor accommodating member located in said motor body and connected to said motor body by means of a plurality of stays, a coreless stator armature accommodated in said motor accommodating member and including a stator yoke provided in an opposing relationship to said rotor with an axial air gap left therebetween, a printed circuit board secured to one surface of said stator yoke, and at least one coreless armature coil disposed at the same-phase positions on a surface of said stator yoke or said printed circuit, a single position-detecting element provided on said coreless stator armature in said motor accommodating member for detecting a position of said rotor, and a driving circuit accommodated in said motor accommodating member and provided on said printed circuit board for driving said coreless stator armature, said stator yoke having at least one cutaway portion formed therein for enabling self-starting of said disk-type single-phase brushless motor, said cutaway portion of said stator yoke being defined by a first radially extending edge formed on an imaginary line passing the center of said stator yoke at an angular position of said stator yoke spaced by an angular distance of about $\theta/2$ in the direction opposite the direction of rotation of said rotor from an imaginary Y axis line which perpendicularly crosses an imaginary X axis line at the center of said stator yoke in a plane of said stator yoke to divide said stator yoke into four imaginary sections, and a second edge formed in another imaginary line which extends substantially in a parallel relationship to said imaginary X axis line from an inner radial end of said first edge to an outer circumferential periphery of said stator yoke such that said cutaway portion has an angular width of $\theta+\alpha$ at the outer ends of said first and second edges of said cutaway portion of said stator yoke, $\alpha$ being an angle smaller than $\theta/2$, said stator yoke being positioned relative to said coreless armature coil such that said first radially extending edge of said cutaway portion thereof is located at a position spaced by an angular distance of an angle between $\theta/6$ and $\theta/3$ from one of the same-phase positions in the direction opposite the direction of rotation of said rotor.

* * * * *